(12) United States Patent
Yu et al.

(10) Patent No.: US 11,442,519 B1
(45) Date of Patent: Sep. 13, 2022

(54) EXTERNAL POWER SUPPLY AND METHOD TO ENHANCE THE OUTPUT POWER DELIVERED BY AN EXTERNAL POWER SUPPLY

(71) Applicant: DELL PRODUCTS L.P., Round Rock, TX (US)

(72) Inventors: Wei Cheng Yu, New Taipei (TW); Geroncio O. Tan, Austin, TX (US); Merle Wood, III, Round Rock, TX (US); Chi Che Wu, Taipei (TW); Tsung-Cheng Liao, Taoyuan (TW); Wen-Yung Chang, Jhong Li (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/182,779

(22) Filed: Feb. 23, 2021

(51) Int. Cl.
| | |
|---|---|
| *G06F 1/26* | (2006.01) |
| *H02M 3/335* | (2006.01) |
| *H02M 1/32* | (2007.01) |
| *G05B 19/042* | (2006.01) |
| *G06F 13/42* | (2006.01) |
| *G06F 1/28* | (2006.01) |

(52) U.S. Cl.
CPC ........... *G06F 1/266* (2013.01); *G05B 19/042* (2013.01); *G06F 1/28* (2013.01); *G06F 13/4282* (2013.01); *H02M 1/32* (2013.01); *H02M 3/33523* (2013.01); *G05B 2219/25257* (2013.01); *G06F 2213/0042* (2013.01); *H02M 1/327* (2021.05)

(58) Field of Classification Search
CPC ........ G06F 1/266; G06F 1/28; G06F 13/4282; G06F 2213/0042; G05B 19/042; G05B 2219/25257; H02M 1/32; H02M 1/327; H02M 3/33523
See application file for complete search history.

(56) References Cited

U.S. PATENT DOCUMENTS

| | | |
|---|---|---|
| 9,240,722 B2 | 1/2016 | Luo et al. |
| 9,436,255 B2 | 9/2016 | Verdun |
| 9,466,974 B2 | 10/2016 | Hsieh et al. |
| 9,678,555 B2 | 6/2017 | Luo et al. |
| 9,787,172 B2 | 10/2017 | Luo et al. |
| 9,906,143 B1 | 2/2018 | Yu et al. |
| 10,601,306 B1 * | 3/2020 | Yu ..................... H02M 3/33523 |

(Continued)

*Primary Examiner* — Glenn A. Auve
(74) *Attorney, Agent, or Firm* — Egan, Enders & Huston LLP.

(57) ABSTRACT

The present disclosure provides various embodiments of an external power supply and methods to enhance the output power delivered by an external power supply to a power consuming load. As described in more detail below, the embodiments disclosed herein enable an external power supply to deliver a higher than maximum output power for short periods of time when ambient temperatures within the external power supply are low. As the ambient temperature increases, the embodiments disclosed herein throttle (or incrementally reduce) the output power delivered by the external power supply until the maximum output power specified for the power supply is reached. Although not strictly limited to such, the external power supply may be a Universal Serial Bus (USB)-enabled AC/DC adapter, and more specifically, a USB Power Deliver (USB-PD) AC/DC adapter, in some embodiments.

21 Claims, 7 Drawing Sheets

(56) References Cited

U.S. PATENT DOCUMENTS

| | | | |
|---|---|---|---|
| 2015/0362984 A1* | 12/2015 | Waters | G06F 1/3287 |
| | | | 713/324 |
| 2018/0067530 A1* | 3/2018 | Hsieh | G06F 1/266 |
| 2018/0188800 A1* | 7/2018 | Alon | G06F 1/206 |
| 2018/0232021 A1* | 8/2018 | Perchlik | G06F 1/203 |
| 2021/0208648 A1* | 7/2021 | Venkideswaran | H02J 7/02 |
| 2021/0333855 A1* | 10/2021 | Liu | H02J 7/00308 |

\* cited by examiner

EXTERNAL POWER SUPPLY AND METHOD TO ENHANCE THE OUTPUT POWER DELIVERED BY AN EXTERNAL POWER SUPPLY

FIELD OF THE INVENTION

This invention relates generally to external power supplies and, more particularly, to output power enhancement for AC/DC adapters.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems (IHSs) (such as, e.g., laptop computers, tablet computers, smart phones, and other portable electronic devices) are designed to operate on battery power, as well as power supplied by a wall outlet. Since batteries only last for a finite time before requiring a new charge, portable IHSs are adapted to plug into a wall outlet providing alternating current (AC) power. However, since portable IHSs primarily operate on direct current (DC) power, an external power supply or AC-DC adapter (typically referred to as an "AC adapter") is commonly used to convert the AC power received from the wall outlet into DC power.

All power supply units (including AC adapters) have a maximum output power rating (e.g., 30 W, 45 W, 65 W or 90 W), which is specified along with a normative current and voltage output (or range of current/voltage outputs). Power supply units (PSUs) typically include a variety of fault protection mechanisms that protect the PSU from damage. For example, when a power consumer (i.e., a system or device coupled to receive DC power from the AC adapter) attempts to sink more power than the maximum output power rating specified for the PSU, an over power protection (OPP) mechanism within the PSU may inhibit the power supply output to avoid damage to the PSU caused by high temperature or current. Other fault protection mechanisms may also be provided within the PSU to provide over current protection (OCP), over temperature protection (OTP), under voltage protection (UVP), etc.

AC adapters may utilize a variety of interfaces for supplying data and/or power delivery to and from the information handling system. One example is the Universal Serial Bus (USB) interface, which is an industry standard developed by the USB Implementers Forum (USB IF) that defines characteristics of the cables, connectors and communications protocols used in a bus for connection, communication, and power delivery between information handling systems and other electronic devices. USB interfaces enable information handling systems and accessories to communicate according to a variety of data communication standards, such as USB 1.x, USB 2.x, USB 3.x (i.e., USB-C), etc.

Under USB standards, the USB interface implements both data communication and power delivery, albeit at varying levels of power. For example, the USB 1.1 standard mandated power delivery of 2.5 W (5V, 500 mA) and USB 3.0 brought this up to 4.5 W (5V, 900 mA). The USB Battery Charging Specification (USB-BC), released in August 2007, increased the power further up to 7.5 W (5V, 1.5 A). USB BC 1.2, released in December 2010, established a more robust set of rules that increased general confidence in the use of USB charging. However, the power capability was only suitable for small devices such as smartphones and digital cameras, and not sufficient to provide the power (typically 20 W or more) required by typical notebook computers and monitors.

The USB Power Delivery 1.0 (USB PD 1.0) Specification, released in July 2012, corrects this shortcoming by allowing power delivery up to 100 W over a single USB cable. The USB PD 1.0 specification included specifications for compliant USB connectors and cables, such as the Type A connectors commonly used on hosts, the Type B commonly used on printers and other peripherals, and the Micro-B connectors commonly used on smartphones, tablets, and other small devices. The USB PD 2.0 Specification, released in 2014, required the use of USB Type-C connectors and introduced power rules that stipulate multiple normative voltages and current to promote smoother power delivery and consumption among devices. The power rules provided in the USB PD 2.0 specification established five supportable power-supply levels (i.e., 15 W, 27 W, 45 W, 65 W, and 100 W), with normative voltage and current values determined by the power supply. For example, a power supply with a 15 W maximum output power rating must be configured to support 5V, 3 A, while a power supply with a 45 W maximum output power rating must be configured to support: 5V 3 A, 9V 3 A, and 15V 3 A.

The USB PD 3.0 Specification, released in in 2015, added safety features to prevent overheating and similar problems. For example, the USB PD 3.0 Specification includes various compliance and authentication features that allow interconnected devices, as well as USB cables, to identify themselves and their capabilities. In addition, the USB PD 3.0 Specification provides various fault protection mechanisms, such as overvoltage protection (OVP), overcurrent protection (OCP), and over-temperature protection (OTP), that enables operation to be stopped, or conditions adjusted, before equipment damage or fire can arise.

In accordance with the USB PD Specification, a power source and sink may communicate to ensure that the cable connecting the source/sink is USB PD-compliant before the source and sink enter negotiations to determine appropriate power conditions in accordance with the specified power rules, taking into consideration the source's capability, the sink's desired voltage and current, and the capabilities of the cable. During an initial power contract negotiation, a USB-PD adapter broadcasts Power Data Object (PDO) information, which contains the adapter's normative voltage and current, as well as its maximum output power rating. In conventional USB-PD adapters, the maximum output power rating is a static number, which is independent of the ambient/operating temperature of the adapter.

Figure 1:
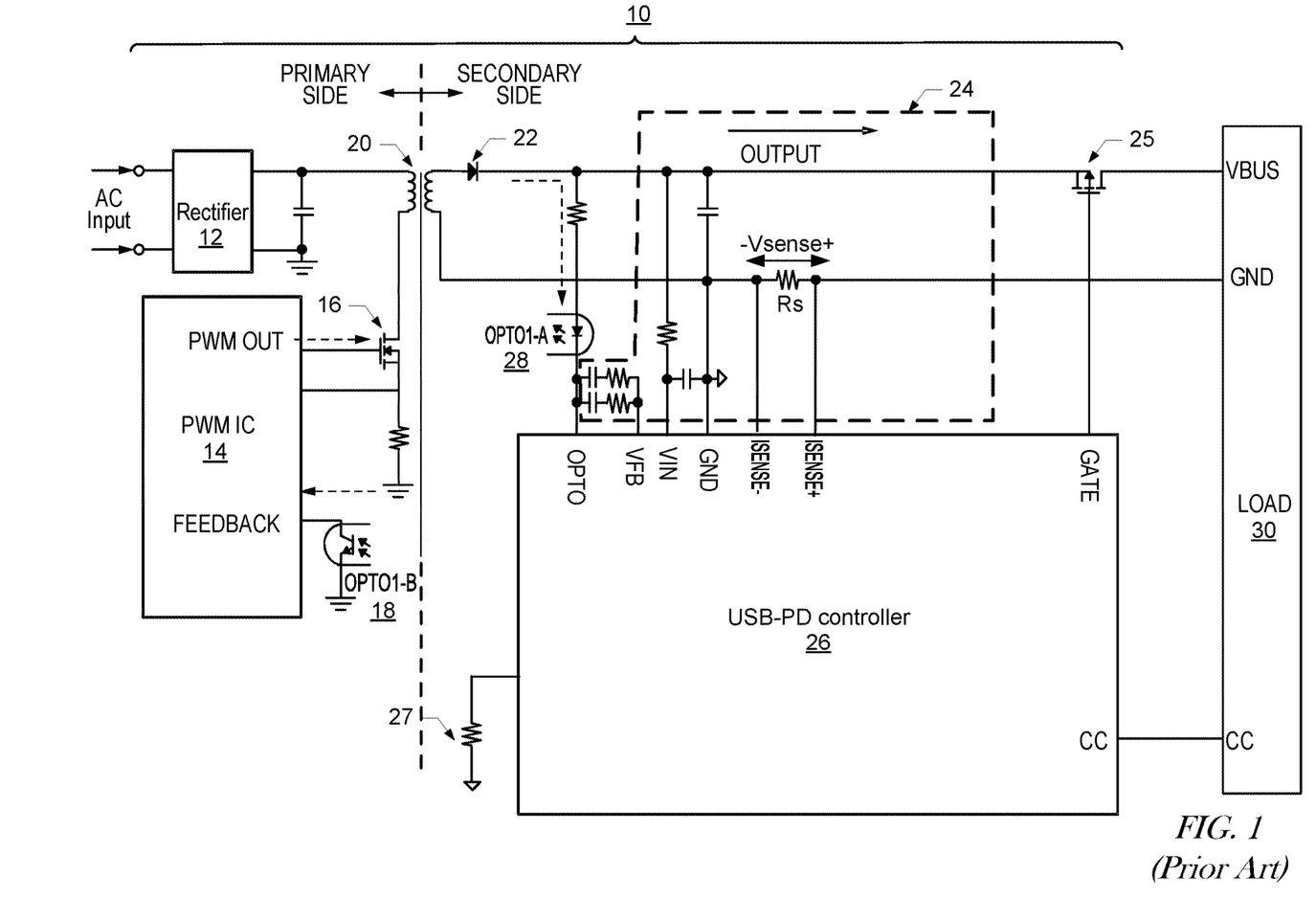
FIG. 1 (PRIOR ART) is a simplified circuit and block diagram illustrating a conventional USB-PD adapter with over temperature protection (OTP).

FIG. 1 illustrates a conventional USB-PD adapter 10 comprising over temperature protection (OTP). As shown in FIG. 1, USB-PD adapter 10 includes a rectifier circuit 12, a Pulse Width Modulation (PWM) integrated circuit (IC) 14 and a switch 16 on a primary side of a transformer 20. When the USB-PD adapter 10 is in use, the rectifier circuit 12 receives AC mains power and performs AC to DC conversion. The rectifier circuit 12 is coupled to a primary coil of the transformer 20, which is inductively coupled to a secondary coil of the transformer to provide output power on the secondary side. PWM IC 14 is coupled to provide a pulse width modulated signal to control the on/off state of the switch 16, and thus, is configured to control the output power on the secondary side by controlling a duty cycle of the on/off state of the switch 16. DC output current is supplied from the secondary coil of the transformer 20 through an output protection switch 25 to the voltage bus (Vbus) input of a load 30 (e.g., an external power consumer, such as a portable IHS).

On the secondary side of the transformer 20, the USB-PD adapter 10 includes a rectifier circuit 22, a current and voltage sensing and feedback network 24, the output protection switch 25 and a USB-PD controller 26. The current and voltage sensing and feedback network 24 senses the current (Isense) and voltage (Vsense) on the secondary side, and provides current/voltage feedback to the PWM IC 14 on the primary side. The USB-PD controller 26 monitors the sensed current (Isense) and voltage (Vsense), determines an appropriate current/voltage (I/V) setting and provides feedback to the PWM IC 14 on the primary side to configure the transformer 20 in accordance with the appropriate I/V setting. In the embodiment shown in FIG. 1, current/voltage feedback is provided by an optocoupler circuit 28/18. The optocoupler 28 on the secondary side flashes to communicate the I/V setting selected by the USB-PD controller 26 to the optocoupler 18 on the primary side. The PWM IC 14 sets the current/voltage of the transformer 20, based on the signals received from the optocoupler circuit 28/18, by controlling the switching frequency of the switch 16. The USB-PD controller 26 communicates with the load 30 by transmitting data over the communication channel (CC). For example, the USB-PD controller 26 may communicate PDO information, including the selected I/V setting and the maximum output power rating of the USB-PD adapter 10, over the CC line to the load 30.

Figure 2:
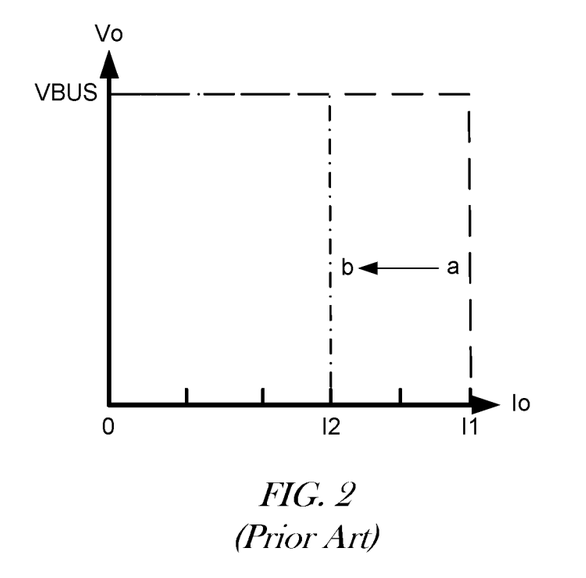
FIG. 2 (PRIOR ART) is a graph illustrating current-voltage (I/V) curves used by the conventional USB-PD adapter shown in FIG. 1 to provide over temperature protection (OTP).

In order to protect USB-PD adapter 10 from over temperature damage, the USB-PD adapter 10 shown in FIG. 1 may also include a temperature sensor 27 (e.g., thermal resistor), which is coupled to the USB-PD controller 26 and used to sense the ambient temperature within the USB-PD adapter 10. When the USB-PD adapter 10 is initially plugged in, the USB-PD controller 26 communicates with the PWM IC 14 to provide a first current level (I1) to the transformer 20 that enables the USB-PD adapter 10 to deliver a DC output current corresponding to its maximum output power rating, and monitors the temperature sensed by the temperature sensor 27 over time. When the monitored temperature exceeds a certain threshold level or after running a certain amount of time, the USB-PD controller 26 supplies a signal to the PWM IC 14 to reduce the current provided to the transformer 20 to a second current level (I2), which is lower than the first current level (I1), as shown in FIG. 2. When the current provided to the transformer 20 is reduced from I1 to I2, the USB-PD adapter 10 delivers less than its maximum output power rating to the load 30. Although this step change in current provides some level of over temperature protection (OTP), its benefit is limited.

SUMMARY OF THE INVENTION

The following description of various embodiments of external power supplies and related methods is not to be construed in any way as limiting the subject matter of the appended claims.

The present disclosure provides various embodiments of an external power supply and methods to enhance the output power delivered by an external power supply to a power consuming load. As described in more detail below, the embodiments disclosed herein enable an external power supply to deliver a higher than maximum output power for short periods of time when ambient temperatures within the external power supply are low. As the ambient temperature increases, the embodiments disclosed herein throttle (or incrementally reduce) the output power delivered by the external power supply until the maximum output power specified for the power supply is reached.

According to one embodiment, a method is provided herein to enhance the output power provided by an external power supply to a power consuming load. The external power supply has a specified maximum output power rating and comprises a transformer coupled to transform an input power to the output power delivered by the external power supply. The method described herein may generally include: detecting an ambient temperature within the external power supply; comparing the ambient temperature to a plurality of temperature threshold values; and determining if current and/or voltage settings for the transformer should be adjusted based on the comparison. In some embodiments, the method may determine that the current and/or voltage settings for the transformer should be adjusted, if the ambient temperature meets or exceeds at least one the plurality of temperature threshold values.

If the method determines that the current and/or voltage settings for the transformer should be adjusted, the method may further include: selecting, from a plurality of current/voltage (I/V) curves, an I/V curve corresponding to a lowest temperature threshold value met or exceeded by the ambient temperature; and using the selected I/V curve to select I/V settings for the transformer that maximize the output power delivered by the external power supply at the ambient temperature.

The plurality of I/V curves may generally include a number of I/V curves ranging between 3 and 4, wherein each of plurality of I/V curves corresponds to a different one of the plurality of temperature threshold values. In preferred embodiments, one or more of the plurality of I/V curves may be used to select I/V settings that enable the transformer to provide more output power than the maximum output power rating specified for the external power supply when the ambient temperature is low. In addition to enhancing the output power delivered by the external power supply to the power consuming load, the plurality of I/V curves may be configured to provide over temperature protection (OTP), under voltage protection (UVP), over current protection (OCP) and over power protection (OPP) for the external power supply.

In some embodiments, the method may repeat the steps of detecting the ambient temperature within the external power supply and comparing the ambient temperature to the plurality of temperature threshold values to determine if the current and/or voltage settings for the transformer should be readjusted based on the comparison. In doing so, each time the ambient temperature meets or exceeds a new temperature threshold value, the method may select a new I/V curve corresponding to the new temperature threshold value to change the I/V curve supported by the external power supply over time, as the ambient temperature rises.

In some embodiments, the method may further include: communicating the selected I/V settings and the output power of the external power supply to the power consuming load; and re-negotiating a new power contract to establish a new power supply relationship between the external power supply and the power consuming load.

According to another embodiment, an external power supply coupled to convert alternating current (AC) power received from an AC power source to a direct current (DC) output current supplied to a power consuming load is provided herein. A maximum output power rating is specified for the external power supply. Although not strictly limited to such, the external power supply may be a Universal Serial Bus (USB)-enabled AC/DC adapter, and more specifically, a USB Power Deliver (USB-PD) AC/DC adapter, in some embodiments.

Among other components, the external power supply may include a rectifier circuit, a transformer and a controller. The rectifier circuit may be coupled to receive the AC power from the AC power source, and may be configured to convert the AC power to DC power. The transformer may be coupled to receive a DC input current from the rectifier circuit on a primary side of the transformer, and may be configured to provide a DC output current and a DC output voltage on a secondary side of the transformer. The controller may be coupled to monitor the DC output current and the DC output voltage provided by the transformer, along with an ambient temperature detected within the external power supply. As described in more detail below, the controller may dynamically determine and select current/voltage (I/V) settings for the transformer that maximize an output power delivered by the external power supply to the power consuming load based on an internal thermal headroom within the external power supply.

In some embodiments, for example, the controller may utilize an adaptive I/V control method, which dynamically determines and selects the I/V settings for the transformer based on the DC output current, the DC output voltage and the ambient temperature. The I/V settings selected by the adaptive I/V control method may enable the transformer to deliver more output power than the maximum output power rating specified for the external power supply when the ambient temperature is low. As the ambient temperature increases, the controller may utilize the adaptive I/V control method to select new I/V settings, which reduce the output power provided by the transformer until the maximum output power rating specified for the external power supply is reached.

In some embodiments, the controller may include a micro-controller unit (MCU) digital core that is configured to store an adaptive I/V control algorithm. When the external power supply is in use, the MCU digital core may execute program instructions within the adaptive I/V control algorithm to: monitor the ambient temperature detected within the external power supply; compare the ambient temperature to a plurality of temperature threshold values; select, from a plurality of I/V curves, an I/V curve corresponding to a lowest temperature threshold value met or exceeded by the ambient temperature; and use the selected I/V curve to select I/V settings for the transformer that maximize the output power delivered by the external power supply at the ambient temperature. In some embodiments, the plurality of IV curves may be stored within a lookup table stored within the MCU digital core.

The plurality of I/V curves may generally include a number of I/V curves ranging between 3 and 4, wherein each of plurality of I/V curves corresponds to a different one of the plurality of temperature threshold values. In preferred embodiments, one or more of the plurality of I/V curves may be used by the MCU digital core to select I/V settings that enable the transformer to provide more output power than the maximum output power rating specified for the external power supply when the ambient temperature is low. In addition to enhancing the output power delivered by the external power supply to the power consuming load, the plurality of IV curves may be configured to provide over temperature protection (OTP), under voltage protection (UVP), over current protection (OCP) and over power protection (OPP) for the external power supply.

In some embodiments, the controller may further include a first comparator, a second comparator, a third comparator, a first N-channel metal-oxide-semiconductor (NMOS) transistor and a second NMOS transistor. The first comparator may be coupled to sense the DC output voltage provided by the transformer. The second comparator may be coupled to compare the DC output voltage sensed by the first comparator to a current threshold value selected by the MCU digital core. The third comparator may be coupled to compare a feedback voltage provided to the controller to a voltage threshold value selected by the MCU digital core.

The first NMOS transistor may have a gate terminal coupled to the output of the second comparator, a source terminal coupled to a ground pin of the controller, and a drain terminal coupled to an optocoupler pin of the controller. When the DC output voltage is less than the current threshold value selected by the MCU digital core, the second comparator may be configured to output a logic low value to the gate terminal of the first NMOS transistor, which turns the first NMOS transistor 'off' and causes the DC output current to increase (when operating in constant current mode).

The second NMOS transistor may have a gate terminal coupled to the output of the third comparator, a source terminal coupled to a ground pin of the controller, and a drain terminal coupled to an optocoupler pin of the controller. When the feedback voltage is less than the voltage threshold value selected by the MCU digital core, the third comparator may be configured to output a logic low value to the gate terminal of the second NMOS transistor, which turns the second NMOS transistor 'off' and causes the DC output voltage to increase (when operating in constant voltage mode).

Each time the ambient temperature meets or exceeds a new one of the temperature threshold values, the MCU digital core may again execute the program instructions within the adaptive I/V control algorithm to select a new current threshold value and/or a new voltage threshold value corresponding to that temperature threshold value to change the I/V curve supported by the external power supply over time, as the ambient temperature rises.

Once I/V settings are selected from an I/V curve, the MCU digital core may execute the program instructions within the adaptive I/V control algorithm to: communicate the selected I/V settings and the output power of the external power supply to the power consuming load; and re-negotiate a new power contract to establish a new power supply relationship between the external power supply and the power consuming load. In some embodiments, the MCU digital core may use Universal Serial Bus (USB) Power Delivery (PD) messages to communicate the selected I/V settings and the output power of the external power supply to the power consuming load and to re-negotiate the new power contract.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 3:
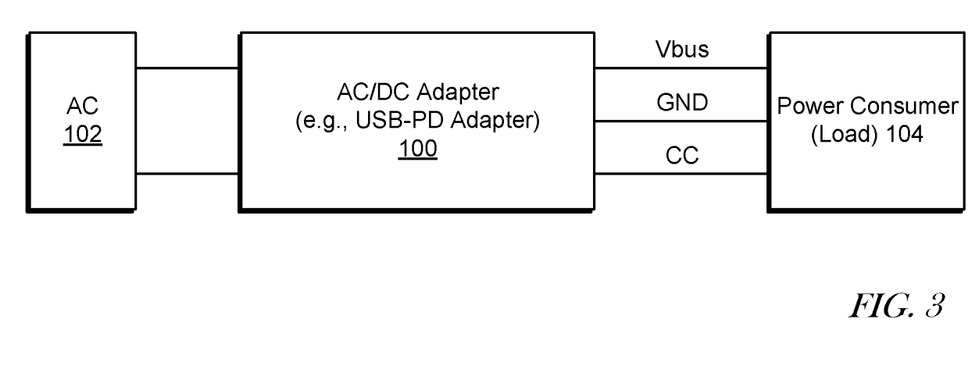
FIG. 3 is a block diagram illustrating an external power supply (e.g., a USB-PD adapter) coupled between an AC power source (e.g., AC mains power) and a power consuming load.

FIG. 3 illustrates an external power supply 100 (e.g., an AC/DC adapter), which is coupled between an AC power source 102 (e.g., AC mains power) and a power consuming load 104. The power consuming load 104 may, for example, include power consuming circuitry of a portable information handling system (IHS), such as but not limited to, a notebook computer, tablet computer, convertible laptop computer, smart phone, etc. In some embodiments, the external power supply 100 may be a USB-enabled AC/DC adapter, which is coupled to supply DC output power to a power consuming load 104 across a voltage bus (Vbus) to ground, as shown. In one exemplary embodiment, the external power supply 100 may be a USB-PD adapter, as described in more detail below. Although exemplary embodiments are shown and described herein, it will be understood that types of external power supplies other than USB-enabled adapters may be configured with the adaptive source power enhancement techniques described herein. Further, an external power supply in accordance with the present disclosure may be configured to provide output power to any type of power consuming load 104 that takes power from the external power supply, such as e.g., peripherals, speakers, light elements such as LEDs, DC motors, radio transmitters receivers or transceivers, etc.

As noted above, all power supplies (including AC adapters) have a maximum output power rating (e.g., 30 W, 45 W, 65 W or 90 W), which is specified along with a maximum current and voltage output. The maximum output power rating of a power supply is generally determined by the internal transformer design. However, a power supply can be configured to provide more output power than it is rated for under certain conditions. At low ambient temperatures, for example, the transformer can support higher flux density saturation. This enables the transformer to deliver more output power to a power consuming load for at least a short period of time. In one illustrative example, a 65 W power supply may be configured to deliver 80 W output power for up to 15 minutes when the ambient temperature inside the power supply is low. By taking advantage of the higher flux density saturation at low ambient temperatures, the output power delivered by the power supply can be enhanced or increased for short periods of time.

The present disclosure provides various embodiments of an external power supply and methods to enhance the output power provided by an external power supply to a power consuming load. As described in more detail below, the embodiments disclosed herein enable an external power supply to deliver a higher than maximum output power for short periods of time when ambient temperatures within the external power supply are low. As the ambient temperature increases, the embodiments disclosed herein throttle (or incrementally reduce) the output power provided by the external power supply until the maximum output power specified for the power supply is reached. Although not strictly limited to such, the external power supply may be a USB-enabled AC/DC adapter, and more specifically, a USB-PD AC/DC adapter, in some embodiments.

In preferred embodiments, the present disclosure provides an adaptive current/voltage (I/V) control method, which dynamically determines optimal I/V settings that maximize the output power provided by an external power supply based on the internal thermal headroom of the power supply. In addition to maximizing the power supply's output power, the adaptive I/V control method described herein provides integrated over temperature protection (OTP), under voltage protection (UVP), over current protection (OCP) and over power protection (OPP). This provides the advantage of reducing costs by eliminating the need for additional OTP/UVP/OCP/OPP circuitry.

By utilizing the techniques described herein, the disclosed embodiments provide a cost-competitive external power supply and method of delivering more output power to efficiently charge a power consuming load without increasing the physical dimensions of the power supply. In some embodiments, the techniques described herein may be used to support fast battery charging features (such as Dell Express Charge) without requiring a physically larger power supply with a higher maximum output power rating.

Figure 4:
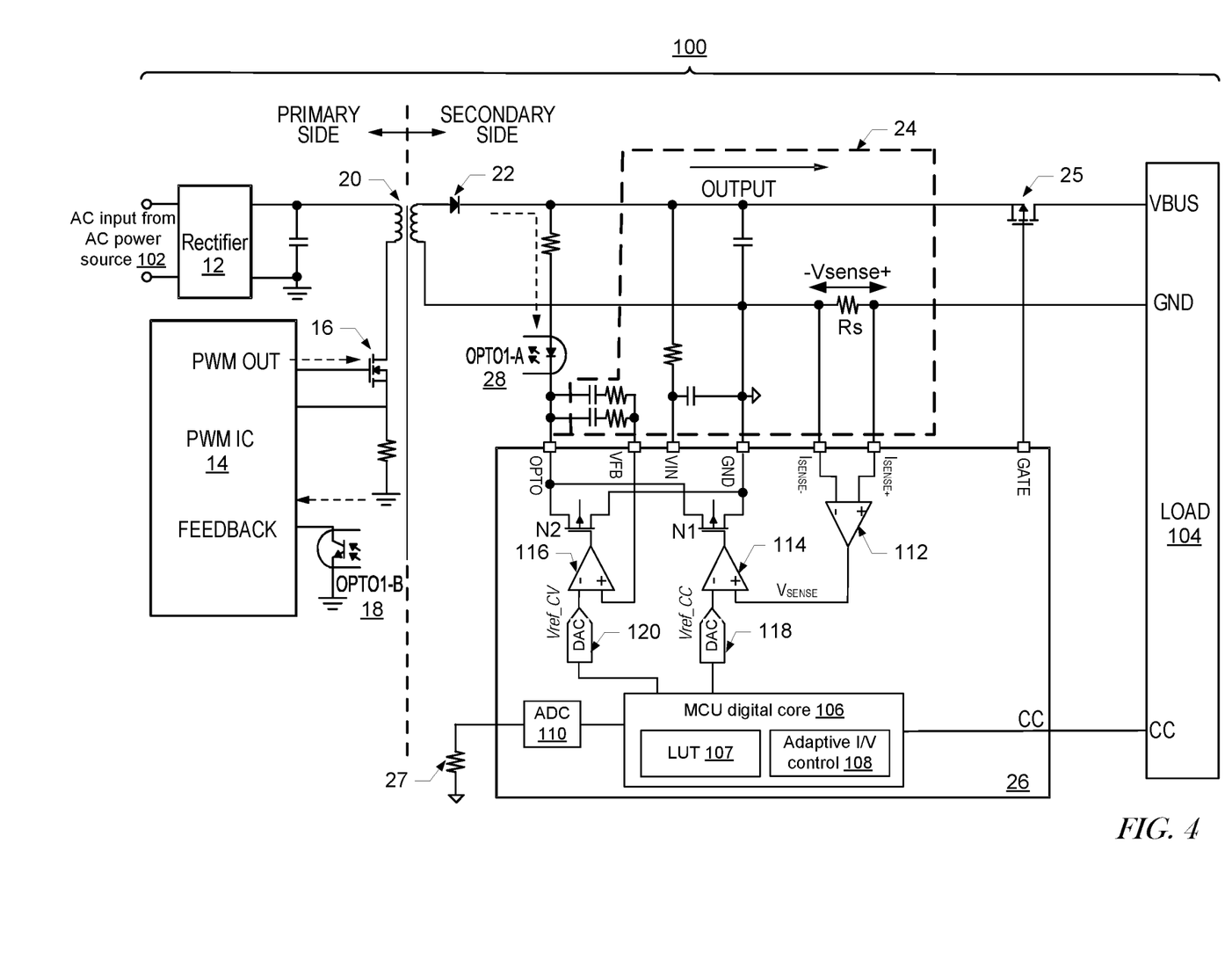
FIG. 4 is a simplified circuit and block diagram illustrating one embodiment of an external power supply (e.g., a USB-PD adapter), which utilizes an adaptive current/voltage (I/V) control method to dynamically determine optimal I/V settings that maximize the output power provided by the external power supply based on the internal thermal headroom of the power supply, in accordance with the present disclosure.

FIG. 4 is a simplified circuit and block diagram illustrating one embodiment of an external power supply 100 that utilizes the techniques described herein. In the illustrated embodiment, external power supply 100 is coupled between an AC power source 102 (e.g., AC mains power) and a power consuming load 104, and configured to convert the AC power received from the AC power source 102 to a DC output current, which is supplied to the Vbus input of the power consuming load 104. In some embodiments, the power consuming load 104 may comprise power consuming components of an information handling system (IHS), such as a notebook computer, tablet computer, convertible laptop computer, smart phone, etc. Examples of power consuming components include, but are not limited to, programmable integrated circuits (such as controllers, microcontrollers, etc.), volatile and/or non-volatile memory (e.g., including DRAM, NVRAM, Flash memory, etc.), video display components, lighting elements (e.g., such as LEDs, LCDs, etc.), cooling fans, amplifiers, radio transceivers, etc.

In the embodiment shown in FIG. 4, the external power supply 100 is implemented as a USB-PD adapter, and thus, includes many of the same components shown in FIG. 1 and described above. Like the USB-PD adapter 10 shown in FIG. 1, the external power supply 100 shown in FIG. 4 includes a rectifier circuit 12, a PWM IC 14, a switch 16 and an optocoupler 18 on a primary side of a transformer 20. On the secondary side of the transformer 20, the external power supply 100 includes a rectifier circuit 22, a current and voltage sensing and feedback network 24, an output protection switch 25, a USB-PD controller 26, a temperature sensor 27 (e.g., a thermal resistor) and an optocoupler 28.

When external power supply 100 is in use, rectifier circuit 12 receives AC power from an AC power source 102 and converts the AC power to DC power. The rectifier circuit 12 is coupled to provide a DC input current to a primary coil of transformer 20, which is inductively coupled to a secondary coil of the transformer 20 to provide a DC output current on the secondary side. The switch 16 is coupled to the primary coil of the transformer 20 and configured to vary the DC input current supplied thereto according to a predetermined switching frequency ($F_{sw}$). By varying the DC input current supplied to the primary coil, a varying magnetic flux is created in the transformer core, which induces a varying electromotive force (EMF) in the secondary coil (due to electromagnetic induction) and produces a DC output current on the secondary side of the transformer 20.

As known in the art, a maximum output power rating may be specified for the external power supply 100, along with a normative current and voltage output (or a range of current/voltage outputs). The maximum output power rating specified for the external power supply 100 is generally dependent on the design of transformer 20, as well as the type and size of the external power supply. In some embodiments, for example, the external power supply 100 may comprise a maximum output power rating of 15 W, 27 W, 45 W, 65 W, or 100 W when implemented as a USB-PD adapter. The transformer 20 included within the external power supply 100 may be configured in flyback, forward or LLC topology, depending on the desired output power range.

PWM IC 14 is coupled to provide a pulse width modulated (PWM) signal to control the on/off state of the switch 16, which in turn, is coupled to the primary coil of the transformer 20. By controlling the duty cycle of the on/off state of the switch 16, the PWM IC 14 controls the switching frequency ($F_{sw}$) of the DC input current supplied to the transformer 20, and thus, the amount of DC output power provided on the secondary side of the transformer 20. The DC output current supplied from the secondary coil of transformer 20 passes through the output protection switch 25 to the voltage bus (Vbus) input of the power consuming load 104.

The current and voltage sensing and feedback network 24 senses the DC output current (Isense) and DC output voltage (Vsense) on the secondary side, and provides current/voltage feedback (IFB, VFB) to the PWM IC 14 on the primary side to configure the transformer 20. As shown in FIG. 4, the current and voltage sensing and feedback network 24 includes a sense resistor (Rs), which is placed in series in the ground return path from the power consuming load 104 to the secondary coil of the transformer 20 to sense the DC output current (Isense) and the DC output voltage (Vsense) provided to the load. Like the conventional embodiment shown in FIG. 1, current/voltage feedback is provided by an optocoupler circuit 28/18. The optocoupler 28 on the secondary side flashes to communicate the I/V setting selected by USB-PD controller 26 to the optocoupler 18 on the primary side. The PWM IC 14 sets the current and/or voltage provided to the transformer 20, based on the signals received from the optocoupler circuit 28/18, by controlling the switching frequency of the switch 16.

The USB-PD controller 26 monitors the DC output current (Isense) and the DC output voltage (Vsense) sensed by the current and voltage sensing and feedback network 24, along with the ambient temperature detected by the temperature sensor 27 coupled thereto. Like the conventional embodiment shown in FIG. 1, the USB-PD controller 26 shown in FIG. 4 uses the sensed current/voltage and the ambient temperature to determine an appropriate I/V setting to feed back to the PWM IC 14 on the primary side of the transformer 20.

Unlike the conventional embodiment shown in FIG. 1, the USB-PD controller 26 shown in FIG. 4 utilizes an adaptive I/V control method, which dynamically determines optimal I/V settings for the transformer 20 that maximize the output power delivered by the external power supply 100 based on the internal thermal headroom of the power supply. More specifically, the adaptive I/V control method described herein enables the transformer 20 to deliver a higher than normative output power for short periods of time when ambient temperatures within the external power supply 100 are low. As the ambient temperature increases, the adaptive I/V control method described herein reduces the output power delivered by the external power supply 100 until the maximum output power rating specified for the power supply is reached. Additional details of the adaptive I/V control method used by the USB-PD controller 26 shown in FIG. 4 are described in more detail below in reference to FIGS. 5 and 6. Once optimal I/V settings are selected, the USB-PD controller 26 shown in FIG. 4 may use USB power delivery (PD) messages to communicate the selected I/V setting and maximum output power over the communication channel (CC) to the power consuming load 104, and to re-negotiate a new power contract to establish a new power supply relationship with the load. Details of the power re-negotiation process are described in more detail below in reference to FIG. 7.

Referring back to FIG. 4, USB-PD controller 26 includes a micro-controller unit (MCU) digital core 106 configured to store an adaptive I/V control algorithm 108. The MCU digital core 106 is coupled to receive a digital signal from an analog to digital converter (ADC) 110, that represents the ambient temperature within the external power supply 100. When external power supply 100 is in use, the MCU digital core 106 executes program instructions within the adaptive I/V control algorithm 108 to monitor the ambient temperature in real time, and use the monitored temperature to select optimal I/V settings for the transformer 20 based on the monitored temperature. More specifically, the MCU digital core 106 may compare the ambient temperature to a plurality of temperature threshold values set by the MCU digital core 106. When the ambient temperature meets or exceeds a new temperature threshold value, the MCU digital core 106 selects new current and voltage threshold values (e.g., Vref_CC and Vref_CV) corresponding to that temperature threshold value to change the output power curve supported by the external power supply 100 over time, as the ambient temperature rises.

Figure 5:
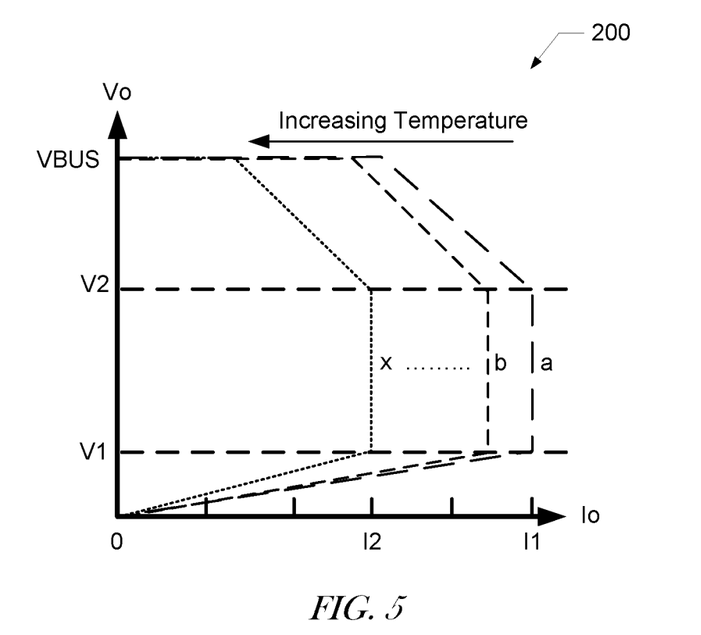
FIG. 5 is a graph illustrating example current-voltage (I/V) curves, which may be used by the external power supply shown in FIG. 4 to implement the adaptive I/V control method described herein.

The USB-PD controller 26 shown in FIG. 4 further includes a first comparator 112, a second comparator 114 and a third comparator 116. The comparators 112, 114 and 116 may be implemented as operational amplifiers, in some embodiments. The USB-PD controller 26 further includes a first digital to analog converter (DAC) 118 for providing a first reference voltage (Vref_CC) selected by the MCU digital core 106 to an input of the second comparator 114, and a second DAC 120 for providing a second reference voltage (Vref_CV) selected by the MCU digital core 106 to an input of the third comparator 116. The first reference voltage (Vref_CC) may correspond to a current threshold value, or optimal current (I) setting for the transformer 20. The second reference voltage (Vref_CV) may correspond to a voltage threshold value, or optimal voltage (V) setting for the transformer 20. The Vref_CC and Vref_CV values may be selected by the MCU digital core 106 based on the monitored temperature, and may be used to change the output current or voltage supplied to the VBUS input of the power consuming load 104. For example, when the external power supply 100 is operating in constant current mode, the Vref_CC value may be changed to change the output current (Jo) level supplied to the VBUS input from 'a' to 'b' to . . . 'x,' as shown in FIG. 5 and described in more detail below. When operating in constant voltage mode, the Vref_CV value may be changed to change the output voltage level supplied to the VBUS input.

As shown in FIG. 4, the first comparator 112 is coupled to sense the voltage drop (Vsense) across the sense resistor (Rs)—i.e., the DC output voltage—when DC output current is supplied to the Vbus input of the power consuming load 104 through the output protection switch 25. A first input (e.g., a positive input) of the second comparator 114 is coupled to the output of the first comparator 112 for receiving the voltage drop (Vsense) sensed across the sense resistor (Rs), while a second input (e.g., a negative input) of the second comparator 114 is coupled to receive the current threshold (Vref_CC) value from the first DAC 118. The output of the second comparator 114 is coupled to the gate terminal of a first N-channel metal-oxide-semiconductor (NMOS) transistor N1. A source terminal of transistor N1 is coupled to a ground (GND) pin, while a drain terminal of the transistor N1 is coupled to an optocoupler (OPTO) pin of the USB controller 26. When the voltage drop (Vsense) sensed across the sense resistor (Rs) is less than the Vref_CC value set by the MCU digital core 106, the second comparator 114 outputs a logic low value (e.g., a logic '0') to the gate terminal of transistor N1. This causes transistor N1 to turn 'off' (or not be fully turned on because it is operating in negative feedback to maintain its output current constant), which in turn, causes the optocoupler circuit 28/18 to signal the PWM IC 14 to increase the duty cycle of the switch 16 to increase the DC output current supplied to the VBUS input (when operating in constant current mode). Transistor N1 is turned 'on' when the voltage drop (Vsense) sensed across the sense resistor (Rs) is greater than the Vref_CC value set by the MCU digital core 106.

A first input (e.g., a positive input) of the third comparator 116 is coupled to the voltage feedback (VFB) pin of the USB controller 26 for receiving a feedback voltage from the current and voltage sensing and feedback network 24, while a second input (e.g., a negative input) of the third comparator 116 is coupled to receive the voltage threshold (Vref_CV) value from the second DAC 120. The output of the third comparator 116 is coupled to the gate terminal of a second NMOS transistor N2. Like transistor N1, a source terminal of transistor N2 is coupled to the ground (GND) pin, while a drain terminal of transistor N2 is coupled to the optocoupler (OPTO) pin of the USB controller 26. When the feedback voltage (VFB) is less than the Vref_CV value set by the MCU digital core 106, the third comparator 116 outputs a logic low value (e.g., a logic '0') to the gate terminal of transistor N2. This causes transistor N2 to turn 'off' (or not be fully turned on), which in turn, causes the optocoupler circuit 28/18 to signal the PWM IC 14 to increase the duty cycle of the switch 16 to increase the DC output voltage supplied to the VBUS input (when operating in constant voltage mode). Transistor N2 is turned 'on' when the feedback voltage (VFB) is greater than the Vref_CV value set by the MCU digital core 106.

As noted above, the MCU digital core 106 selects the Vref_CC and Vref_CV values based on the ambient temperature detected within the external power supply 100. In some embodiments, the MCU digital core 106 may compare the ambient temperature to a plurality of temperature threshold values set by the MCU digital core 106. When the ambient temperature meets or exceeds a new temperature threshold value, the MCU digital core 106 selects new current and/or voltage threshold values (e.g., Vref_CC and/or Vref_CV) corresponding to that temperature threshold value to change the maximum output power curve supported by the external power supply 100 over time, as the ambient temperature rises. The new output power curve can be an I/V curve with any custom I/V value, such as constant voltage, constant current and/or constant power. The I/V values included within the I/V curve are set by the MCU digital core 106 and can be customized through firmware.

The graph 200 shown in FIG. 5 illustrates exemplary I/V curves (e.g., I/V curves a, b . . . x) that may be used by the MCU digital core 106 to select appropriate Vref_CC and Vref_CV values based on the ambient temperature detected within the external power supply 100. Each of the I/V curves shown in FIG. 5 corresponds to a different one of the temperature threshold values set by the MCU digital core 106. For example, the MCU digital core 106 may select I/V curve 'a' when the external power supply 100 is initially plugged into an AC power source 102 and the ambient temperature is low (e.g., room temperature or slightly above). When I/V curve 'a' is selected by the MCU digital core 106, the USB-PD controller 26 signals the PWM IC 14 to provide a first maximum current level (I1) to the transformer 20 when the DC output voltage provided between the Vbus and GND inputs of the power consuming load 104 is between a first voltage threshold (V1) and a second voltage threshold (V2), which is greater than V1 but less than Vbus. As the ambient temperature within the external power supply 100 increases, the MCU digital core 106 may select a new I/V curve (e.g., I/V curve b, . . . x) to change the maximum output power curve supported by the external power supply 100 over time.

The area under each I/V curve corresponds to the DC output power provided by the external power supply 100 to the power consuming load 104. In preferred embodiments, the MCU digital core 106 may use one or more of the I/V curves shown in FIG. 5 to deliver more DC output power than the maximum output power rating specified for the external power supply 100, for at least a short period of time, when the ambient temperature within the external power supply 100 is relatively low. In one example implementation, I/V curves 'a,' 'b' . . . etc. may be used to provide more DC output power than the maximum output power rating specified for the external power supply 100 when the ambient temperature is relatively low. I/V curve 'x', on the other hand, may be used to provide DC output power at the maximum output power rating.

For example, I/V curve 'a' may be selected to provide a first current level (I1) to the transformer 20 that enables the external power supply 100 to deliver up to 80 W of DC output power in a 65 W power supply when the ambient temperature within the power supply is equal to or less than, for example, 70° F. When I/V curve 'b' is selected, a reduced current level provided to the transformer 20 may enable the external power supply 100 to deliver approximately 70 W of DC output power in a 65 W power supply when the ambient temperature within the power supply is equal to or less than, for example, 144° F. When the ambient temperature within the power supply reaches, for example, 176° F., the I/V curve 'x' may be selected to provide a second current level (I2) to the transformer 20 that enables the external power supply 100 to provide DC output power at the maximum output power rating (e.g., 65 W of DC output power in a 65 W power supply) specified for the external power supply The I/V curves 'a,' 'b' . . . etc. shown in FIG. 5 enable the transformer 20 to provide higher peak power at lower ambient/operating temperature(s). In one example transformer design, the flux density saturation point ($B_{sat1}$) of the transformer 20 at 70° F. may be about 15% higher than the flux density saturation point ($B_{sat2}$) at 100° F. The higher flux density saturation enables transformer 20 to deliver more DC output power to the power consuming load 104 at the lower temperature than it would otherwise be able to deliver in a conventional power supply design, such as the USB-PD adapter 10 shown and described in FIGS. 1 and 2. In some embodiments, the switching frequency ($F_{sw}$) of the transformer 20 shown in FIG. 4 may also be increased (e.g., from 65 kHz to 100 kHz) to reduce $\Delta B_{sat}$ while operating in a higher peak power mode to further increase the $B_{sat}$ margin.

Unlike the I/V curves shown in FIG. 2, which only provide over temperature protection (OTP) by stepping the maximum output current down from I1 to I2 when a single temperature threshold is reached, the I/V curves shown in FIG. 5 provide over temperature protection (OTP), under voltage protection (UVP), over current protection (OCP) and over power protection (OPP) for the external power supply 100. In the embodiment shown in FIG. 5, OTP is provided by selecting a new I/V curve (e.g., I/V curve b, . . . x) each time the ambient temperature meets or exceeds a new temperature threshold value. In addition to OTP, each of the I/V curves shown in FIG. 5 provides integrated UVP, OCP and OPP. For example, each I/V curve provides UVP by quickly turning off or ramping the maximum output current down to zero when the DC output voltage is less than V1. In addition, each I/V curve provides constant power by gradually reducing the maximum output current to a lower current level when the DC output voltage is greater than V2, but less than Vbus. OCP and OPP are also provided to protect the external power supply 100.

It is noted that the I/V curves shown in FIG. 5 are merely one example of IV curves that may be used by the MCU digital core 106 to select appropriate Vref_CC and Vref_CV values, and thus optimal I/V settings for the transformer 20, based on the ambient temperature monitored by the digital core. Other I/V curves providing integrated OTP, UVP, OCP and OPP may also be used. It is further noted that substantially any number of I/V curves may be used by the MCU digital core 106 to select the optimal I/V settings. Although not limited to such, the number of I/V curves may range between 3 and 4, in some embodiments. It is additionally noted that the I/V curves may be implemented in a variety of different ways. In one embodiment, for example, a plurality of I/V curves corresponding to a plurality of temperature threshold values may be stored within a lookup table (LUT) 107 stored within the MCU digital core 106.

Figure 6:
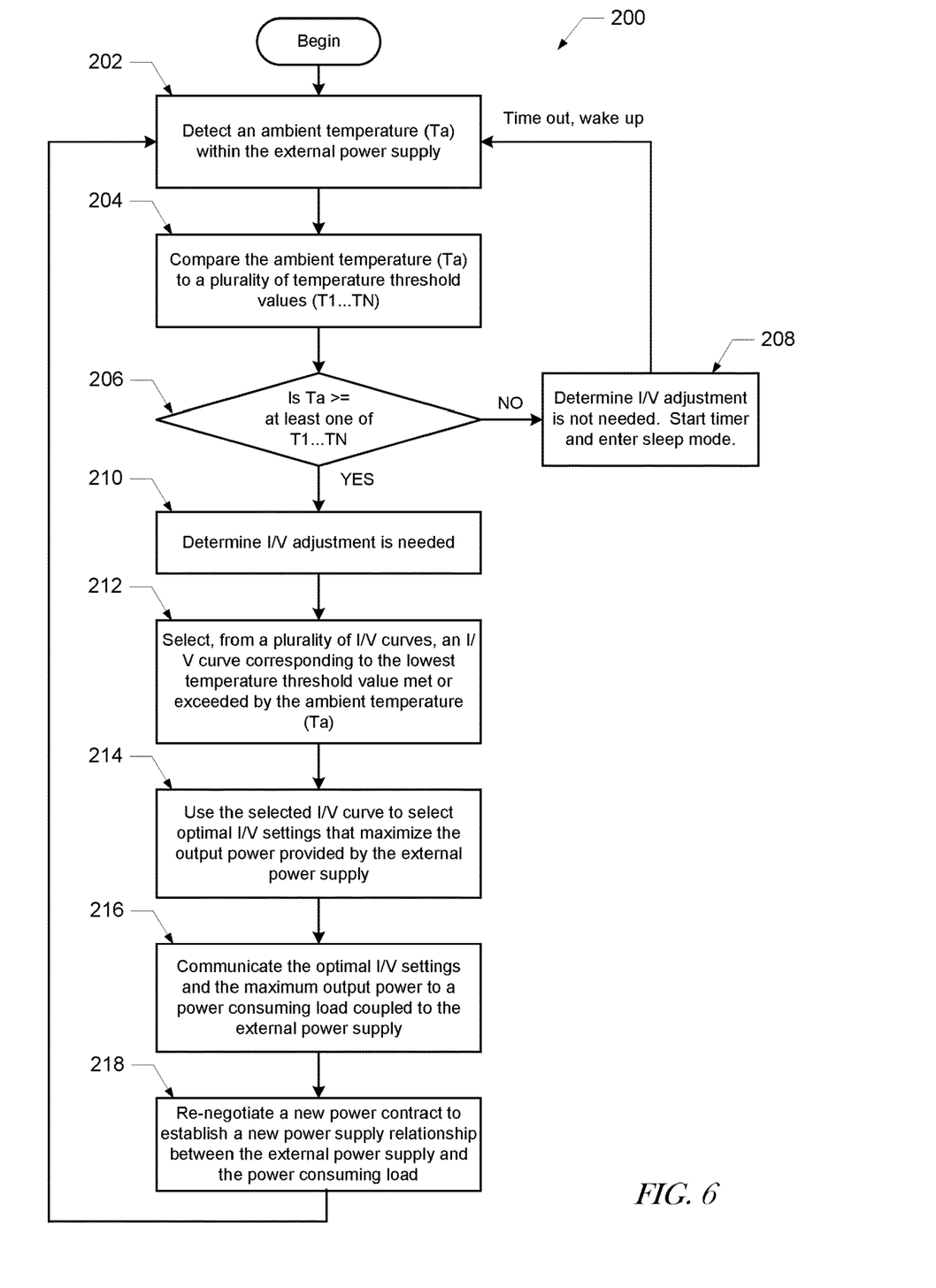
FIG. 6 is a flowchart diagram illustrating one embodiment of a method to enhance the output power provided by an external power supply to a power consuming load.

FIG. 6 illustrates one embodiment of a method 300 (e.g., an adaptive I/V control method) that may be used by the USB-PD controller 26 shown in FIG. 4 to enhance the output power delivered by an external power supply 100 to a power consuming load 104. More specifically, method 300 illustrates one embodiment of an adaptive I/V control method, which may be used to dynamically determine optimal I/V settings for the transformer 20 that maximize the output power delivered by the external power supply 100 based on the internal thermal headroom within the power supply. In some embodiments, the method 300 shown in FIG. 6 may be performed, at least in part, by the MCU digital core 106 executing program instructions contained within the adaptive I/V control algorithm 108.

In some embodiments, the method 300 shown in FIG. 6 may begin when the external power supply 100 is plugged in to an AC power source 102 and coupled to a power consuming load 104. When the external power supply 100 in use, the MCU digital core 106 executes the program instructions within the adaptive I/V control algorithm 108 to detect an ambient temperature (Ta) within the external power supply 100 (in step 202), compare the ambient temperature (Ta) to a plurality of temperature threshold values (T1 . . . N) set by the MCU digital core 106 (in steps 204 and 206), and determine if current and/or voltage settings (referred to herein as I/V settings) for the transformer 20 should be adjusted (in steps 208 and 210) based on the comparison.

In some embodiments, the method 300 may determine that I/V adjustment is not needed (in step 208) if the ambient temperature (Ta) is less than the plurality of temperature threshold values (T1 . . . N) set by the MCU digital core 106 (NO branch of step 206). If I/V adjustment is not needed, method 300 may start a timer and enter a sleep mode (in step 208). The timer may be set with substantially count value. Upon time out, the method 300 may wake the MCU digital core 106 and return to step 202 to continue monitoring and detecting the ambient temperature within the external power supply 100. As such, the timer may be used to periodically monitor ambient temperatures within the external power supply 100 until the ambient temperature (Ta) meets or exceeds at least one the plurality of temperature threshold values (T1 . . . N) set by the MCU digital core 106.

When the ambient temperature (Ta) meets or exceeds at least one the plurality of temperature threshold values (T1 . . . N) set by the MCU digital core 106 (YES branch of step 206), the method 300 determines that I/V adjustment is needed (in step 210) and selects, from a plurality of I/V curves, an I/V curve corresponding to the lowest temperature threshold value met or exceeded by the ambient temperature (in step 212). As noted above, the plurality of I/V curves are used by the MCU digital core 106 to select optimal I/V settings for the transformer 20 that maximize the output power provided by the external power supply 100 based on the ambient temperature detected in step 202. In some embodiments, one or more of the I/V curves may be used to select I/V settings, which enable the external power supply 100 to provide more DC output power than its maximum output power rating. Each time the ambient temperature (Ta) meets or exceeds a new temperature threshold value, a new I/V curve corresponding to that temperature threshold value is selected in step 212 to change the output power curve supported by the external power supply 100 over time, as the ambient temperature rises.

In step 212, the method 300 may select a particular I/V curve from a number of IV curves ranging between 3 and 4. Each I/V curve may be associated with a different temperature threshold value. By selecting a particular I/V curve based on temperature (in step 212), the method 300 provides over temperature protection (OTP) for the external power supply 100. In addition to OTP, each I/V curve may be configured to provide under voltage protection (UVP), over current protection (OCP) and over power protection (OPP) as described above, for example, in reference to FIG. 5.

As shown in FIG. 6, the method 300 uses the I/V curve selected in step 212 to select optimal I/V settings for the transformer 20 that maximize the output power delivered by the external power supply 100 (in step 214), communicates the selected I/V settings and the maximum output power to the power consuming load 104 (in step 216), and re-negotiates a new power contract to establish a new power supply relationship between the external power supply 100 and the power consuming load 104 (in step 218).

In some embodiments, the MCU digital core 106 may utilize USB power delivery (PD) messages to communicate the I/V settings and maximum output power to the power consuming load 104 (in step 216) and re-negotiates a new power contract (in step 218). As shown in FIG. 4, USB-PD messages are communicated from the MCU digital core 106 to the power consuming load 104 over the communication channel (CC). For example, the MCU digital core 106 may use USB-PD messages to broadcast Power Data Object (PDO) information to the power consuming load 104, wherein the PDO information includes the I/V settings and maximum output power selected in step 214. Additional USB-PD messages may be communicated between the MCU digital core 106 and the power consuming load 104 to re-negotiate a new power contract to establish a new power supply relationship between the external power supply 100 and the power consuming load 104 (in step 218). Once the new power supply relationship is established (in step 218), the method 300 may return to step 202 to continue monitoring the ambient temperature.

When the external power supply 100 is initially plugged in to an AC power source 102 and coupled to a power consuming load 104 (e.g., when method 300 begins), the external power supply establishes an initial power contract with the power consuming load by using a USB-PD message (e.g., a SourceCapabilities message) to report its capabilities (e.g., current, voltage, power) in a series of 32-bit Power Data Objects (PDOs). The PDO information may generally include current/voltage settings for the transformer 20, as well as a maximum output power that can be delivered by the external power supply 100 to the power consuming load 104.

In preferred embodiments, the external power supply 100 may initially broadcast PDO information containing a higher than maximum output power rating when the ambient temperature (Ta) within the external power supply is low. As the ambient temperature (Ta) rises and meets or exceeds a temperature threshold value (YES branch of step 206), the external power supply 100 selects a new I/V curve corresponding to the temperature threshold value (in step 212) and broadcasts its PDO again (in step 216), this time with a lower maximum output power rating. This allows the power consuming load 104 to initially sink more power when ambient temperature is low, and adjust accordingly as the external power supply 100 heats up.

Figure 7:
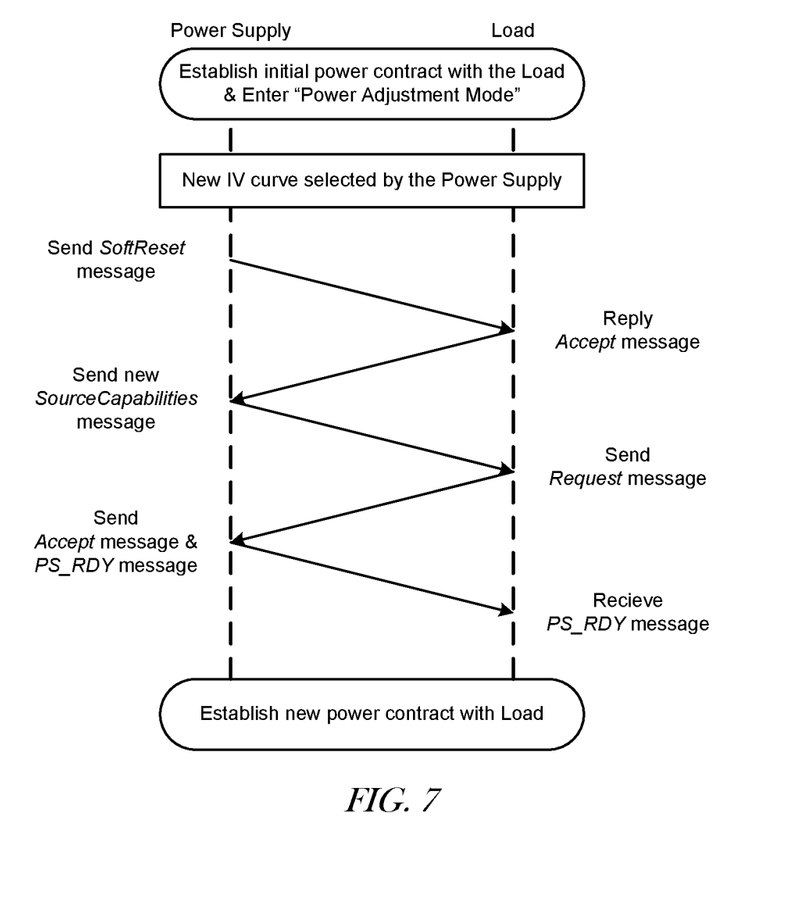
FIG. 7 is a flowchart diagram illustrating how USB-PD messages can be used to re-negotiate a new power contract between an external power supply and a power consuming load.

FIG. 7 is a flowchart diagram illustrating how USB-PD messages can be used to re-negotiate a new power contract between the external power supply 100 and the power consuming load 104. When the external power supply 100 is initially plugged in to an AC power source 102 and coupled to a power consuming load 104, the external power supply establishes an initial power contract with the power consuming load using USB-PD messages, as described above. In addition, the external power supply 100 may use a USB-PD Vendor Defined Message (VDM) to enter a "Power Adjustment Mode." The Power Adjustment Mode enables the external power supply 100 to re-negotiate a new power contract with the power consuming load 104 when the ambient temperature within the power supply rises.

When the ambient temperature within the external power supply 100 rises and a new I/V curve is selected (in step 212 of FIG. 3), the external power supply 100 sends a SoftReset message to the power consuming load 104 requesting a soft reset. The soft reset enables the external power supply 100 to re-negotiate a new power contract with the power consuming load 104 at the physical level without disconnecting the Vbus connection between the power supply and the load. The power consuming load 104 responds to the SoftReset message by sending an Accept message, which indicates that the load is willing to enter a new power contract. Once the Accept message is received, the external power supply 100 sends a new SourceCapabilities message to the power consuming load 104. The new SourceCapabilities message includes PDOs containing new current and voltage settings and a new maximum output power rating for the external power supply 100. The power consuming load 104 responds to the new SourceCapabilities message by sending a Request message to request power from the external power supply 100. The external power supply 100 responds to the Request message by sending an Accept message and a power supply ready (PS_RDY) message to the power consuming load 104 indicating that the power supply has reached the desired operating conditions specified under the new power contract. The new power contract is established once the PS_RDY message is received.

FIGS. 4-7 provide various embodiments of an external power supply and related methods to enhance the output power provided by an external power supply. As set forth above, the embodiments disclosed herein enable an external power supply to deliver a higher than nominal output power for short periods of time when ambient temperatures within the external power supply are low. As the ambient temperature increases, the embodiments disclosed herein throttle (or incrementally reduce) the output power provided by the external power supply until the nominal output power specified for the power supply is reached.

In preferred embodiments, the present disclosure provides an adaptive current/voltage (I/V) control method (e.g., method 300), which dynamically determines optimal I/V settings that maximize the output power provided by an external power supply based on the internal thermal headroom of the power supply. In addition to maximizing the power supply's output power, the adaptive I/V control method described herein provides integrated over temperature protection (OTP), under voltage protection (UVP), over current protection (OCP) and over power protection (OPP). This reduces the cost of the external power supply 100 by eliminating the need for additional OTP/UVP/OCP/OPP circuitry.

It will be understood that the particular configuration of the external power supply 100 illustrated in FIG. 4 is exemplary only (including the exemplary number and type of circuit components, as well as interconnection topology of such components). The particular voltage, current and power values described herein are also exemplary. In this regard, it will be understood that any alternate configuration of circuit components may be employed that is suitable for implementing the adaptive I/V control method shown in FIG. 3 in an external power supply (such as, e.g., a USB-PD AC/DC adapter).

It will also be further understood that one or more of the tasks, functions, or methodologies described herein may be implemented using one or more programmable integrated circuits (e.g., central processing units (CPUs), processors, controllers, microcontrollers, microprocessors, hardware accelerators, FPGAs (field programmable gate arrays), ASICs (application specific integrated circuits), and/or other programmable integrated circuits) that are programmed to perform the operations, tasks, functions, or actions described herein for the disclosed embodiments. For example, the one or more programmable integrated circuits (e.g., the MCU digital core 106, etc.) can be configured to execute or otherwise be programmed with software, firmware, logic, and/or other program instructions (e.g., the adaptive I/V control algorithm 108, etc.), which are stored within one or more non-transitory tangible computer-readable mediums (e.g., data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as a CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of a CPU, controller, microcontroller, microprocessor, FPGA, CPLD and ASIC. The computer program of instructions may include an ordered listing of executable instructions for implementing logical functions in an information handling system or a component thereof. The executable instructions may include a plurality of code segments operable to instruct components of an information handling system to perform the methodology disclosed herein. It will also be understood that one or more steps of the present methodologies may be employed in one or more code segments of the computer program. For example, a code segment executed by an information handling system may include one or more steps of the disclosed methodologies.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed external power supplies and related methods may be utilized in various combinations and/or independently. Thus, the invention is not limited to only those combinations shown herein, but rather may include other combinations.

What is claimed is:

1. A method to enhance an output power delivered by an external power supply to a power consuming load, wherein the external power supply has a maximum output power rating and comprises a transformer coupled to transform an input power to the output power delivered by the external power supply, wherein the method comprises:

detecting an ambient temperature within the external power supply;

comparing the ambient temperature to a plurality of temperature threshold values; and determining if current and/or voltage settings for the transformer should be adjusted based on the comparison;

wherein if the method determines that the current and/or voltage settings for the transformer should be adjusted, the method further comprises:

selecting, from a plurality of current/voltage (I/V) curves, an I/V curve corresponding to a lowest temperature threshold value met or exceeded by the ambient temperature; and using the selected I/V curve to select I/V settings for the transformer that maximize the output power delivered by the external power supply at the ambient temperature.

2. The method as recited in claim 1, wherein said determining comprises determining the current and/or voltage settings for the transformer should be adjusted if the ambient temperature meets or exceeds at least one the plurality of temperature threshold values.

3. The method as recited in claim 1, wherein the plurality of I/V curves comprise either 3 or 4 IV curves, and wherein each of plurality of I/V curves corresponds to a different one of the plurality of temperature threshold values.

4. The method as recited in claim 1, wherein one or more of the plurality of I/V curves are used to select I/V settings that enable the transformer to provide more output power than the maximum output power rating specified for the external power supply when the ambient temperature is equal to or less than 70° F.

5. The method as recited in claim 1, wherein the plurality of I/V curves provide over temperature protection (OTP), under voltage protection (UVP), over current protection (OCP) and over power protection (OPP) for the external power supply.

6. The method as recited in claim 1, further comprising:
repeating the steps of detecting the ambient temperature within the external power supply and comparing the ambient temperature to the plurality of temperature threshold values to determine if the current and/or voltage settings for the transformer should be readjusted based on the comparison;
wherein each time the ambient temperature meets or exceeds a new temperature threshold value, the method further comprises selecting a new I/V curve corresponding to the new temperature threshold value to change the I/V curve supported by the external power supply over time, as the ambient temperature rises.

7. The method as recited in claim 1, further comprising:
communicating the selected I/V settings and the output power of the external power supply to the power consuming load; and
re-negotiating a new power contract to establish a new power supply relationship between the external power supply and the power consuming load.

8. An external power supply coupled to convert alternating current (AC) power received from an AC power source to a direct current (DC) output current supplied to a power consuming load, where a maximum output power rating is specified for the external power supply, and wherein the external power supply comprises:
a rectifier circuit coupled to receive the AC power from the AC power source and configured to convert the AC power to DC power;
a transformer coupled to receive a DC input current from the rectifier circuit on a primary side of the transformer, and configured to provide a DC output current and a DC output voltage on a secondary side of the transformer; and
a controller coupled to monitor the DC output current and the DC output voltage, along with an ambient temperature detected within the external power supply, wherein the controller is configured to dynamically determine and select current/voltage (I/V) settings for the transformer that maximize an output power delivered by the external power supply to the power consuming load based on an internal thermal headroom within the external power supply.

9. The external power supply as recited in claim 8, wherein the controller utilizes an adaptive I/V control method, which dynamically determines and selects the I/V settings for the transformer based on the DC output current, the DC output voltage and the ambient temperature.

10. The external power supply as recited in claim 9, wherein the I/V settings selected by the adaptive I/V control method enable the transformer to deliver more output power than the maximum output power rating specified for the external power supply when the ambient temperature is equal to or less than 70° F.

11. The external power supply as recited in claim 10, wherein as the ambient temperature increases, the controller utilizes the adaptive I/V control method to select new I/V settings that reduce the output power provided by the transformer until the maximum output power rating specified for the external power supply is reached.

12. The external power supply as recited in claim 8, wherein the controller comprises a micro-controller unit (MCU) digital core that is configured to store an adaptive I/V control algorithm, wherein when the external power supply is in use, the MCU digital core executes program instructions within the adaptive I/V control algorithm to:
monitor the ambient temperature detected within the external power supply;
compare the ambient temperature to a plurality of temperature threshold values;
select, from a plurality of I/V curves, an I/V curve corresponding to a lowest temperature threshold value met or exceeded by the ambient temperature; and
use the selected I/V curve to select I/V settings for the transformer that maximize the output power delivered by the external power supply at the ambient temperature.

13. The external power supply as recited in claim 12, wherein the plurality of I/V curves comprise either 3 or 4 I/V curves, and wherein each of plurality of I/V curves corresponds to a different one of the plurality of temperature threshold values.

14. The external power supply as recited in claim 12, wherein one or more of the plurality of I/V curves are used by the MCU digital core to select I/V settings for the transformer that enable the external power supply to provide more output power than the maximum output power rating when the ambient temperature is equal to or less than 70° F.

15. The external power supply as recited in claim 12, wherein the plurality of I/V curves provide over temperature protection (OTP), under voltage protection (UVP), over current protection (OCP) and over power protection (OPP) for the external power supply.

16. The external power supply as recited in claim 12, wherein the controller further comprises:
a first comparator coupled to sense the DC output voltage;
a second comparator coupled to compare the DC output voltage sensed by the first comparator to a current threshold value selected by the MCU digital core; and
a third comparator may be coupled to compare a feedback voltage provided to the controller to a voltage threshold value selected by the MCU digital core.

17. The external power supply as recited in claim 16, wherein the controller further comprises:
a first N-channel metal-oxide-semiconductor (NMOS) transistor having a gate terminal coupled to the output of the second comparator, a source terminal coupled to a ground pin of the controller and a drain terminal coupled to an optocoupler pin of the controller;
wherein when the DC output voltage is less than the current threshold value selected by the MCU digital core, the second comparator outputs a logic low value to the gate terminal of the first NMOS transistor, which turns the first NMOS transistor off and causes the DC output current to be increased.

18. The external power supply as recited in claim 16, wherein the controller further comprises:
- a second N-channel metal-oxide-semiconductor (NMOS) transistor having a gate terminal coupled to the output of the third comparator, a source terminal coupled to a ground pin of the controller and a drain terminal coupled to an optocoupler pin of the controller;
- wherein when the feedback voltage is less than the voltage threshold value selected by the MCU digital core, the third comparator outputs a logic low value to the gate terminal of the second NMOS transistor, which turns the second NMOS transistor off and causes the DC output voltage to be increased.

19. The external power supply as recited in claim 16, wherein each time the ambient temperature meets or exceeds a new one of the temperature threshold values, the MCU digital core executes the program instructions within the adaptive I/V control algorithm to select a new current threshold value and/or a new voltage threshold value corresponding to that temperature threshold value to change the I/V curve supported by the external power supply over time, as the ambient temperature rises.

20. The external power supply as recited in claim 12, wherein once the I/V settings are selected, the MCU digital core executes the program instructions within the adaptive I/V control algorithm to:
- communicate the selected I/V settings and the output power of the external power supply to the power consuming load; and
- re-negotiate a new power contract to establish a new power supply relationship between the external power supply and the power consuming load.

21. The external power supply as recited in claim 20, wherein the MCU digital core uses Universal Serial Bus (USB) Power Delivery (PD) messages to communicate the selected I/V settings and the output power of the external power supply to the power consuming load and to re-negotiate the new power contract.

* * * * *